US011353432B2

(12) United States Patent
Park et al.

(10) Patent No.: US 11,353,432 B2
(45) Date of Patent: Jun. 7, 2022

(54) METHOD FOR MEASURING ADHESIVE STRENGTH OF THIN FILM USING DISPERSION CHARACTERISTICS OF SURFACE WAVES, AND COMPUTER-READABLE RECORDING MEDIUM HAVING PROGRAM FOR PERFORMING SAME RECORDED THEREON (71) Applicant: Seoul National University of Technology Center for Industry Collaboration, Seoul (KR)

(72) Inventors: Ik Keun Park, Seoul (KR); Tae Sung Park, Seoul (KR); Yu Min Choi, Seoul (KR); Dong Ryul Kwak, Seoul (KR)

(73) Assignee: Seoul National University of Technology Center for Industry Collaboration, Seoul (KR)

( * ) Notice: Subject to any disclaimer, the term of this patent is extended or adjusted under 35 U.S.C. 154(b) by 62 days.

(21) Appl. No.: 16/647,880

(22) PCT Filed: Sep. 14, 2018

(86) PCT No.: PCT/KR2018/010815
§ 371 (c)(1),
(2) Date: Mar. 17, 2020

(87) PCT Pub. No.: WO2019/059586
PCT Pub. Date: Mar. 28, 2019

(65) Prior Publication Data
US 2020/0217820 A1 Jul. 9, 2020

(30) Foreign Application Priority Data
Sep. 20, 2017 (KR) .................. 10-2017-0120986

(51) Int. Cl.
G01N 29/44 (2006.01)
G01N 19/04 (2006.01)
(Continued)

(52) U.S. Cl.
CPC ......... *G01N 29/4472* (2013.01); *G01N 19/04* (2013.01); *G01N 29/046* (2013.01); *G01N 29/07* (2013.01); *G01N 2291/0423* (2013.01)

(58) Field of Classification Search
CPC .. G01N 29/4472; G01N 29/046; G01N 29/07; G01N 2291/0423; G01N 19/04
(Continued)

(56) References Cited

U.S. PATENT DOCUMENTS

2014/0150558 A1* 6/2014 El Gowini ......... G01N 29/2475
73/658

FOREIGN PATENT DOCUMENTS

CN    101846655 A  *  9/2010
CN    102087203 B  *  5/2012
(Continued)

OTHER PUBLICATIONS

"Evaluation of Adhesive Properties in Polymeric Thin Film by Ultrasonic Atomic Force Microscopy", Journal of the Korean Society for Nondestructive Testing, 32(2): 142-148, Apr. 2004.
(Continued)

Primary Examiner — Lisa M Caputo
Assistant Examiner — Rose M Miller (57) ABSTRACT Disclosed are a method for measuring the adhesive strength of a thin film using surface waves, and a computer-readable recording medium having a program for performing same recorded thereon. The method for measuring the adhesive strength of a thin film measures the adhesive strength between a substrate and a thin film by means of an electronic calculator, using sound waves measured from a thin film structure having a thin film formed on a substrate. The method, which is performed by the electronic calculator, comprises the steps of: receiving, as a first input value, the thickness, density, longitudinal wave velocity, and shear wave velocity of a first thin film and a substrate the adhesive strength between which is to be measured; calculating, from
(Continued)

the first input value, the thickness and density of a second thin film virtually configured between the first thin film and substrate, and setting as a second input value; calculating the longitudinal wave velocity and shear wave velocity of the second thin film according to the stiffness constant of the second thin film, while varying the stiffness constant, and setting as a third input value; using the first to third input values to acquire a transfer matrix between the first thin film, second thin film, and substrate; using the transfer matrix to calculate the dispersion characteristics of the speed of surface waves; and substituting, to dispersion curves, the propagation speed of the surface waves measured from the substrate having the first thin film formed thereon, in order to acquire the stiffness constant matching the propagation speed of the measured surface waves and measure the adhesive strength between the substrate and the thin film.

7 Claims, 9 Drawing Sheets

(51) Int. Cl.
*G01N 29/07* (2006.01)
*G01N 29/04* (2006.01)

(58) Field of Classification Search
USPC .......................................................... 702/39
See application file for complete search history.

(56) References Cited

FOREIGN PATENT DOCUMENTS

| CN | 104820017 A | * | 8/2015 |
| CN | 105486747 A | * | 4/2016 |
| JP | 08-105736 | | 4/1996 |
| JP | 2006-214818 | | 8/2006 |
| KR | 10-1369500 | | 3/2014 |
| KR | 10-1694634 | | 1/2017 |
| WO | WO 2019/059586 | | 9/2020 |

OTHER PUBLICATIONS

International Search Report and the Written Opinion dated Dec. 11, 2018 From the International Searching Authority Re. Application No. PCT/EP2016/058813 and Its Translation of Search Report Into English. (12 Pages).

* cited by examiner

METHOD FOR MEASURING ADHESIVE STRENGTH OF THIN FILM USING DISPERSION CHARACTERISTICS OF SURFACE WAVES, AND COMPUTER-READABLE RECORDING MEDIUM HAVING PROGRAM FOR PERFORMING SAME RECORDED THEREON

RELATED APPLICATIONS

This application is a National Phase of PCT Patent Application No. PCT/KR2018/010815 having International filing date of Sep. 14, 2018, which claims the benefit of priority of Korean Patent Application No. 10-2017-0120986 filed on Sep. 20, 2017. The contents of the above applications are all incorporated by reference as if fully set forth herein in their entirety.

FIELD AND BACKGROUND OF THE INVENTION

The present invention relates to a method of measuring adhesive strength of a thin film and a computer-readable recording medium having a program which is recorded thereon and performs the same, and more particularly, to a method of measuring adhesive strength of a thin film using a dispersion characteristic of a surface wave and a computer-readable recording medium having a program which is recorded thereon and performs the same.

Various electronic devices used in our daily life, such as semiconductors, flat panel display devices, and the like, are manufactured by depositing various kinds of thin films on a substrate. That is, electronic products are manufactured through various processes such as stacking thin films having micro/nano thicknesses on a substrate and developing and etching these thin films.

However, after the thin films are deposited, when delamination occurs due to weak adhesion, defects occur. Therefore, when a defect is detected by measuring adhesion of the thin film, it is preferable to not proceed to a subsequent process of the defective thin film.

As described above, the existing techniques used to measure adhesion of a thin film include mechanical evaluation methods such as a pull-off test, a scratch test, and indentation test, and methods using microscopes such as an optical microscope (OM), a scanning electron microscope (SEM), a transmission electron microscopy (TEM), and an atomic force microscope (AFM).

However, the above described methods are destructive tests in which a sample is damaged during measurement and preparation. Therefore, there occurs a problem that the sample on which inspection is completed cannot be used.

Further, even in the case of thin films deposited through the same process, adhesion may not be the same. In this case, a sample undergoing inspection is damaged and cannot be used, and a sample not undergoing inspection has a problem that adhesion cannot be inspected.

SUMMARY OF THE INVENTION

The present invention is directed to providing a method which allows adhesive strength of a thin film to be measured by employing a non-destructive method.

The present invention is also directed to providing a computer-readable recording medium having a program which is recorded thereon and which performs the method.

One aspect of the present invention provides a method of measuring adhesive strength of a thin film using a dispersion characteristic of a surface wave according to one exemplary embodiment of the present invention which is a method of measuring adhesive strengths of a substrate and a thin film through an electronic calculator using sound waves measured from a thin film structure on which the thin film is formed on the substrate, wherein the method includes receiving, by the electronic calculator, a thickness, a density, a longitudinal wave velocity, and a shear wave velocity of each of a first thin film and the substrate, of which adhesive strengths will be measured, as first input values; calculating, by the electronic calculator, a thickness and a density of a second thin film, which is virtually set between the first thin film and the substrate, from the first input values and setting the calculated thickness and the calculated density as second input values; calculating, by the electronic calculator, a longitudinal wave velocity and a shear wave velocity of the second thin film according to a stiffness constant by varying the stiffness constant of the second thin film and setting, by the electronic calculator, the calculated longitudinal wave velocity and the calculated shear wave velocity as third input values; obtaining, by the electronic calculator, a transfer matrix between the first thin film, the second thin film, and the substrate using the first to third input; calculating, by the electronic calculator, a dispersion characteristic of a velocity of a surface wave using the transfer matrix; and substituting, by the electronic calculator, a propagation speed of the surface wave measured from the substrate, on which the first thin film is formed, into a dispersion curve and obtaining a stiffness constant matching the propagation speed of the surface wave to measure adhesive strengths between the substrate and the thin film.

In this case, in the calculating of the thickness and the density of the second thin film, which is virtually set between the first thin film and the substrate, from the first input values and the setting of the calculated thickness and the calculated density as the second input values, the thickness of the second thin film may be set in a range of 3% to 5% of the thickness of the first thin film, and the density of the second thin film may be set in a range of 10% to 12% of a material having the lowest density among the first thin film and the substrate below the first thin film.

The calculating of the dispersion characteristic of the velocity of the surface wave using the transfer matrix may be performed through a condition in which a characteristic equation of the transfer matrix is zero.

The calculating of the longitudinal wave velocity and the shear wave velocity of the second thin film according to the stiffness constant by varying the stiffness constant of the second thin film and setting the calculated longitudinal wave velocity and the calculated shear wave velocity as the third input values may be performed through a relational expression of $$C_L = \sqrt{\frac{K_N d_i}{\rho_i}}$$

$$C_S = \sqrt{\frac{K_T d_i}{\rho_i}}$$

(here, $C_L$ and $C_S$ are sound wave velocities of the longitudinal wave and the shear wave, $K_N$ and $K_T$ are a normal stiffness constant and a tangential stiffness constant, $d_i$ is a thickness of the second thin film, and $\rho_i$ is a density of the second thin film).

Another aspect of the present invention provides a method of measuring adhesive strength of a thin film using a dispersion characteristic of a surface wave according to another exemplary embodiment of the present invention which is a method of measuring adhesive strengths of a substrate and a thin film through an electronic calculator using sound waves measured from a thin film structure on which the thin film is formed on the substrate, wherein the method includes receiving, by the electronic calculator, a thickness, a density, a longitudinal wave velocity, and a shear wave velocity of each of a first thin film and the substrate, of which adhesive strengths will be measured, as first input values; calculating, by the electronic calculator, a thickness and a density of a second thin film, which is virtually set between the first thin film and the substrate, from the first input values and setting the calculated thickness and the calculated density as second input values; receiving, by the electronic calculator, a propagation speed of the surface wave measured from the substrate on which the first thin film is formed; obtaining, by the electronic calculator, a transfer matrix between the first thin film, the second thin film, and the substrate using the first input values, the second input values, and the propagation speed of the surface wave; calculating, by the electronic calculator, the longitudinal wave velocity and the shear wave velocity of the sound wave in the second thin film using the transfer matrix; and obtaining, by the electronic calculator, a stiffness constant of the second thin film using the longitudinal wave velocity and the shear wave velocity of the sound wave in the second thin film and extracting the adhesive strengths of the substrate and the first thin film through the stiffness constant of the second thin film.

In this case, in the calculating of the thickness and the density of the second thin film, which is virtually set between the first thin film and the substrate, from the first input values and the setting of the calculated thickness and the calculated density as the second input values, the thickness of the second thin film may be set in a range of 3% to 5% of the thickness of the first thin film, and the density of the second thin film may be set in a range of 10% to 12% of a material having the lowest density of materials of the first thin film and the substrate below the first thin film.

The calculating of the longitudinal wave velocity and the shear wave velocity of the sound wave in the second thin film using the transfer matrix may be performed through a condition in which the characteristic equation of the transfer matrix is zero.

The obtaining of the stiffness constant of the second thin film using the longitudinal wave velocity and the shear wave velocity of the sound wave in the second thin film and the measuring of the adhesive strengths between the substrate and the first thin film through the stiffness constant of the second thin film may be performed through a relational expression of $$C_L = \sqrt{\frac{K_N d_i}{\rho_i}}$$

$$C_S = \sqrt{\frac{K_T d_t}{\rho_i}}$$

(here, $C_L$ and $C_S$ are sound wave velocities of the longitudinal wave and the shear wave, $K_N$ and $K_T$ are a normal stiffness constant and a tangential stiffness constant, $d_i$ is a thickness of the second thin film, and $\rho_i$ is a density of the second thin film).

Still another aspect of the present invention provides a computer-readable recording medium in which a program for the method of measuring adhesive strength of a thin film according to the present invention is recorded.

As described above, in accordance with the method of measuring adhesive strength of a thin film using a dispersion characteristic of a surface wave according to the present invention and a computer-readable recording medium having a program which is recorded thereon and performs the same, the adhesive strength of the thin film can be non-destructively measured using the surface wave.

Further, according to the above-described one exemplary embodiment of the present invention, dispersion characteristics can be tabulated, and then the dispersion characteristics tabulated by measuring the surface waves of the thin films manufactured through the same process can be used so that an iterative calculation cannot be required.

Further, according to the above-described another exemplary embodiment of the present invention, iterative calculation is required after measuring the surface wave, but, even when a value is present between the stiffness constants of the tabulated dispersion characteristics, the adhesive strength can be obtained more accurately.

DESCRIPTION OF SPECIFIC EMBODIMENTS OF THE INVENTION

The present invention may be modified in various forms and may have a variety of embodiments, and, therefore, specific embodiments will be illustrated in the drawings and a description thereof will be described in detail in the following description. The embodiments to be disclosed below, however, are not to be taken in a sense which limits the present invention to specific embodiments and should be construed to include modification, equivalents, or substitutes within the spirit and technical scope of the present invention. In describing each drawing, a similar reference numeral is given to a similar component. In the accompanying drawings, dimensions of structures are shown in an exaggerated scale for clarity of the present invention.

The terms first, second, and the like may be used to describe various components, but the components should not be limited by these terms. The terms are used only for the purpose of distinguishing one component from another component. For example, without departing from the scope of the present invention, a first component may be referred to as a second component, and similarly, the second component may also be referred to as the first component.

The terms used herein are employed to describe only specific embodiments and are not intended to limit the present invention. Unless the context clearly dictates otherwise, the singular form includes the plural form. It should be understood that the terms "comprise," "include," "have," and the like specify the presence of stated herein features, numbers, steps, operations, components, elements, or combinations thereof, but do not preclude the presence or possibility of adding one or more other features, numbers, steps, operations, components, elements, or combinations thereof. Further, A and B being "connected" or "coupled" means that A and B are directly connected or combined and further means that another component C is included between A and B so that A and B are connected or coupled.

Unless otherwise defined, all terms including technical or scientific terms used herein have the same meaning as commonly understood by those skilled in the art to which the present invention pertains. General terms that are defined in a dictionary shall be construed to have meanings that are consistent in the context of the relevant art and will not be interpreted as having an idealistic or excessively formalistic meaning unless clearly defined in this disclosure. Further, in the claims for the method invention, operations may be performed in a changed order unless the operation are explicitly bound in order.

The present invention may be illustrated as being implemented in a suitable computing environment. Further, various methods according to the present invention may be provided as a recording medium recording computer software for implementing the same.

The recording medium typically may include various computer-readable media and may be provided as any available media which are accessible by a computer. Further, the recording medium may include a volatile or non-volatile medium, a removable or non-removable medium, and the like. For example, the recording medium may include all media implemented by any method or technology for storing information such as computer-readable commands, data structures, program modules, or other data. The recording medium may include a random access memory (RAM), a read only memory (ROM), an electrically erasable and programmable ROM (EEPROM), a flash memory, or other memory technology, or a compact disc read only memory (CD-ROM), a digital versatile disc (DVD), or other optical disk storage device, or a magnetic cassette, a magnetic tape, a magnetic disk storage device, or other magnetic storage device, or any other medium which may be used to store desired information and accessed by a computer, but the present invention is not limited thereto.

Hereinafter, exemplary embodiments of the present invention will be described in detail with reference to the accompanying drawings.

Figure 1:
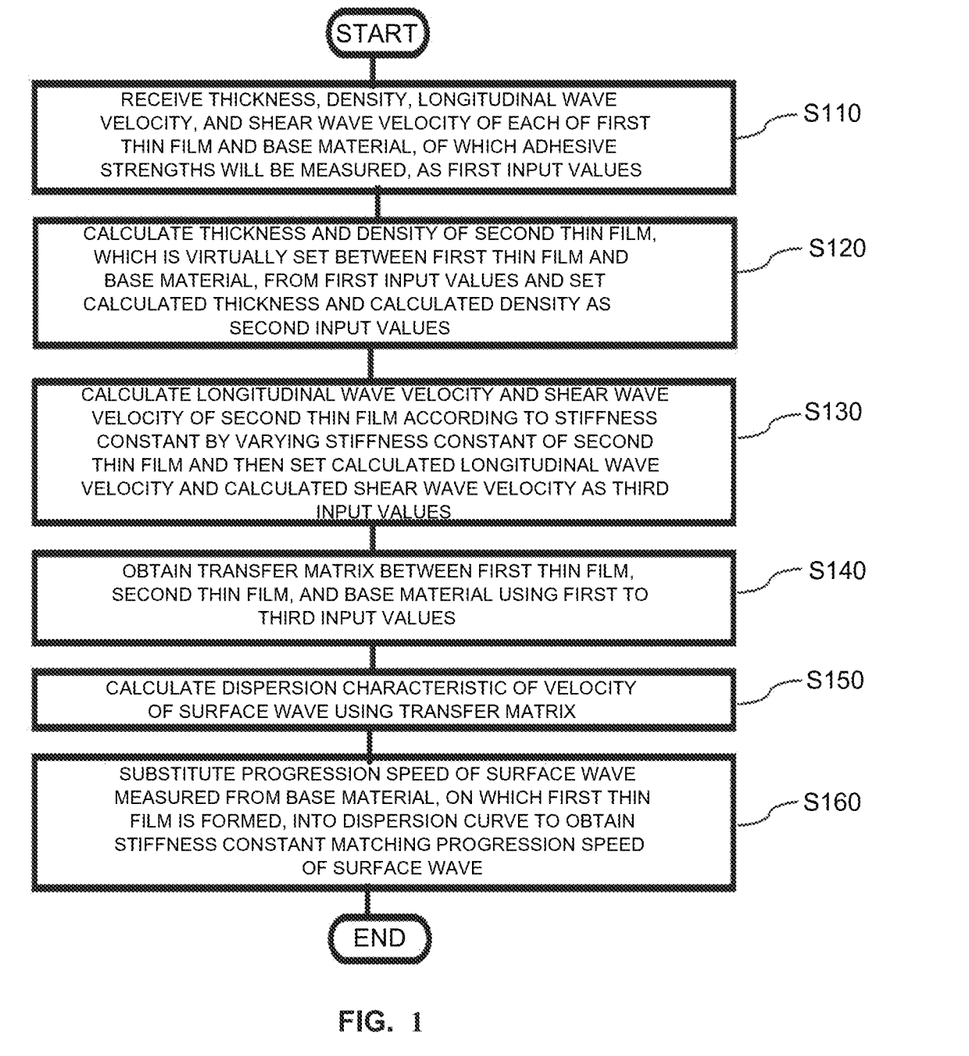
FIG. 1 is a flowchart illustrating a method of measuring adhesive strength of a thin film using a dispersion characteristic of a surface wave according to one exemplary embodiment of the present invention.

FIG. 1 is a flowchart illustrating a method of measuring adhesive strength of a thin film using a dispersion characteristic of a surface wave according to one exemplary embodiment of the present invention.

Referring to FIG. 1, the method of measuring adhesive strength of a thin film using a dispersion characteristic of a surface wave according to one exemplary embodiment of the present invention is a method of measuring adhesive strengths of a substrate and a thin film through an electronic calculator using sound waves measured from a thin film structure on which the thin film is formed on the substrate.

For example, the sound wave measured from the thin film structure is a surface wave, and a velocity of the surface wave depends on a frequency, a thickness of the thin film, and adhesion between the thin film and the substrate. Thus, when the frequency and the thickness are fixed, the velocity of the surface wave depends on the adhesion between the thin film and the substrate. The method of measuring adhesive strength according to the present invention uses the above principle.

For example, the substrate may be a pure thin film structure on which a thin film is not formed and may be in a state in which a plurality of thin films are stacked on a thin film structure. The method of measuring adhesive strength of a thin film according to one exemplary embodiment of the present invention may be performed through an electronic calculator such as a computer.

According to the above method, a thickness, a density, a longitudinal wave velocity, and a shear wave velocity of each of a first thin film and the substrate, of which adhesive strengths will be measured, are input first as first input values (S110). As described above, when a plurality of thin films are stacked on the substrate, a thickness, a density, a longitudinal wave velocity, and a shear wave velocity of each layer are received as first input values in addition to those of the thin film structure. A deposition thickness in a deposition process may be input as the thickness of the first thin film, and since the materials of the first thin film and the substrate are determined, the densities, the longitudinal wave velocities, and the shear wave velocities may be input as known values depending on the materials.

Then, a thickness and a density of a second thin film, which is virtually set between the first thin film and the substrate, are calculated from the first input values and set as second input values (S120). For example, the thickness of the second thin film may be set in a range of 3% to 5% of the thickness of the first thin film, and the density of the second thin film may be set in a range of 10% to 12% of a material having the lowest density of materials of the first thin film and the substrate below the first thin film.

That is, in the present invention, the virtual second thin film is set between the first thin film and the substrate, and a stiffness constant of the second thin film is measured so that the adhesion between the first thin film and the substrate is proportionally calculated. More specifically, when the stiffness constant of the virtual second thin film is large, the adhesion between the first thin film and the substrate is evaluated as being strong, and, when the stiffness constant of the virtual second thin film is small, the adhesion between the first thin film and the substrate is evaluated as being weak.

As described above, after the virtual second thin film is set, a dispersion curve graph of the surface wave is simulated between the substrate, the second thin film above the substrate, and the first thin film above the second thin film.

To this end, the longitudinal wave velocity and the shear wave velocity of the second thin film according to the stiffness constant are calculated by varying the stiffness constant of the second thin film and are then set as third input values (S130). The stiffness constant, the longitudinal wave velocity, and the shear wave velocity satisfy a relationship of Equation 26 which will be described below. The longitudinal wave velocity and the shear wave velocity of the second thin film are calculated by gradationally increasing the stiffness constant of the second thin film from a lower limit to an upper limit and are then set as the third input values. In this case, as an interval between the lower limit and the upper limit of the stiffness constant becomes smaller, resolution of a dispersion curve may be increased and more accurate values may be obtained, but there is a disadvantage in that an arithmetic operation time becomes longer.

Thereafter, a transfer matrix between the first thin film, the second thin film, and the substrate is obtained using the first to third input values (S140). Then, a dispersion characteristic of the velocity of the surface wave is calculated using the transfer matrix (S150).

Hereinafter, a process of calculating the dispersion characteristic of the velocity of the surface wave from the transfer matrix will be described in more detail.

In the present invention, a behavior of an ultrasonic wave propagating in a multilayer thin film made of an elastic isotropic material is theoretically modeled through a stress-displacement relational expression.

An equation for stress and displacement of an isotropic elastic body is derived by superposition of four bulk waves in the multilayer thin film. To this end, an equation for the bulk wave should be derived using a wave equation. Then, a boundary condition should be applied to a continuity condition between layers. Analysis of layers may be performed in two dimensions (in a plane) and a derivation of a motion equation of a wave with respect to an infinite elastic body is developed using an orthogonal coordinates system (x, y, z), displacements (u, v, w), and density. As in Equation 1 below, a wave equation may be derived according to Newton's second law.

$$\rho \frac{\partial^2 u}{\partial t^2} = \frac{\partial \sigma_{xx}}{\partial x} + \frac{\partial \sigma_{xy}}{\partial y} + \frac{\partial \sigma_{xz}}{\partial z}$$

$$\rho \frac{\partial^2 v}{\partial t^2} = \frac{\partial \sigma_{yx}}{\partial x} + \frac{\partial \sigma_{yy}}{\partial y} + \frac{\partial \sigma_{yz}}{\partial z}$$

$$\rho \frac{\partial^2 w}{\partial t^2} = \frac{\partial \sigma_{zx}}{\partial x} + \frac{\partial \sigma_{zy}}{\partial y} + \frac{\partial \sigma_{zz}}{\partial z}$$

Equation 1

Here, $\sigma_{xx, xy} \ldots$ mean stress components, and t means a time.

Equation 1 is a basic stress equation of a wave motion and is expressed as displacements of Equation 2 below by applying a stress-strain relationship and a strain-displacement relationship.

$$\epsilon_{xx} = \frac{\partial u}{\partial x}, \epsilon_{yy} = \frac{\partial v}{\partial y}, \epsilon_{zz} = \frac{\partial w}{\partial z}$$

$$\epsilon_{xy} = \frac{\partial u}{\partial y} + \frac{\partial v}{\partial x}, \epsilon_{yz} = \frac{\partial v}{\partial z} + \frac{\partial w}{\partial y}, \epsilon_{xz} = \frac{\partial u}{\partial z} + \frac{\partial w}{\partial x}$$

$$\sigma_{xx} = \lambda \Delta + 2\mu \epsilon_{xx}, \sigma_{yy} = \lambda \Delta + 2\mu \epsilon_{yy}, \sigma_{zz} = \lambda \Delta + 2\mu \epsilon_{zz}$$

$$\sigma_{xy} = \mu \epsilon_{xy}, \sigma_{yz} = \mu \epsilon_{yz}, \sigma_{xz} = \mu \epsilon_{xz}$$

Equation 2

Here, $\lambda$ and $\mu$ are Lame' constants and $\Delta = \epsilon_{xx} + \epsilon_{yy} + \epsilon_{zz}$ is volumetric strain.

When Equation 2 is substituted into Equation 1, an equation relating to wave displacement may be obtained as Equation 3.

$$\rho \frac{\partial^2 u}{\partial t^2} = (\lambda + \mu) \frac{\partial}{\partial x} \cdot \left( \frac{\partial u}{\partial x} + \frac{\partial v}{\partial y} + \frac{\partial w}{\partial z} \right) + \mu \nabla^2 u$$

$$\rho \frac{\partial^2 v}{\partial t^2} = (\lambda + \mu) \frac{\partial}{\partial y} \cdot \left( \frac{\partial u}{\partial x} + \frac{\partial v}{\partial y} + \frac{\partial w}{\partial z} \right) + \mu \nabla^2 v$$

$$\rho \frac{\partial^2 w}{\partial t^2} = (\lambda + \mu) \frac{\partial}{\partial z} \cdot \left( \frac{\partial u}{\partial x} + \frac{\partial v}{\partial y} + \frac{\partial w}{\partial z} \right) + \mu \nabla^2 w$$

Equation 3

In order to derive a solution for Equation 3, the following conditions are required.

1. In Equation 3, a wave is assumed to be a uniform plane wave.
2. Therefore, wavefronts are perpendicular to a propagating direction and the plane.
3. Further, all displacements of the wavefronts are the same.

Through the above conditions, two solutions for Equation 3 are derived. The two solutions mean equations for the longitudinal wave and the shear wave and are represented by a scalar function $\varphi$ and a vector function using the Helmholtz equation.

$$\phi = Ae^{i(kx - wt)} = Ae^{i(k_x x + k_y y + k_z z - wt)}$$

$$\psi = Be^{i(kx - wt)} = Be^{i(k_x x + k_y y + k_z z - wt)}$$

Equation 4

Here, A and B are amplitudes of the longitudinal wave and the shear wave, respectively. k is a wave vector, and w is an angular frequency. The wave vector is a propagation direction of the surface wave, and a wavelength and a velocity c are $2\pi/k$ and $\omega/k$, respectively. Generally, the amplitudes A and B are represented by $Ae^{i\varphi}$ and $Be^{i\varphi}$ which are complex numbers. Here, $\varphi$ is a phase of a wave at x=0 and t=0. Using Equation 4, displacement vectors of the longitudinal wave and the shear wave are expressed as Equation 5 below.

$$\left\{ \begin{matrix} u \\ v \\ w \end{matrix} \right\}_{(L)} = \left\{ \begin{matrix} \frac{\partial}{\partial x} \\ \frac{\partial}{\partial y} \\ \frac{\partial}{\partial z} \end{matrix} \right\} \phi, \quad \left\{ \begin{matrix} u \\ v \\ w \end{matrix} \right\}_{(S)} = \left\{ \begin{matrix} \frac{\partial}{\partial x} \\ \frac{\partial}{\partial y} \\ \frac{\partial}{\partial z} \end{matrix} \right\} \times \psi$$

Equation 5

When the two displacement vectors are substituted into Equation 3, a velocity of each wave may be derived as Equation 6 below using material properties.

$$c_{(L)} = \left( \frac{\lambda + 2\mu}{\rho} \right)^{1/2} = \alpha,$$

$$c_{(S)} = \left( \frac{\mu}{\rho} \right)^{1/2} = \beta$$

Equation 6

Here, $c_{(L)}$ and $c_{(S)}$ represent velocities of the longitudinal wave and the shear wave. Since a wavelength is negligibly smaller than a width of the structure, wavelength analysis for a multilayer structure is generally performed in two dimensions. Therefore, a plane displacement may be obtained and the wave equation may be simplified. In this case, the coordinate system is regarded as two axes in the propagation direction and a normal direction of the wave.

Here, when the displacement vectors of the longitudinal wave and the shear wave are obtained using Equations 4 and 5, these may be represented as Equation 7 below.

$$\begin{Bmatrix} u \\ v \\ w \end{Bmatrix}_{(L)} = \begin{Bmatrix} \frac{\partial}{\partial x} \\ \frac{\partial}{\partial y} \\ \frac{\partial}{\partial z} \end{Bmatrix} \phi = \begin{Bmatrix} k_1 \\ k_2 \\ 0 \end{Bmatrix} A e^{i(kx-wt)}$$

$$\begin{Bmatrix} u \\ v \\ w \end{Bmatrix}_{(S)} = \begin{Bmatrix} \frac{\partial}{\partial x} \\ \frac{\partial}{\partial y} \\ \frac{\partial}{\partial z} \end{Bmatrix} \times \psi = \begin{Bmatrix} k_1 \\ -k_2 \\ 0 \end{Bmatrix} B e^{i(kx-wt)}$$

Equation 7

Figure 2:
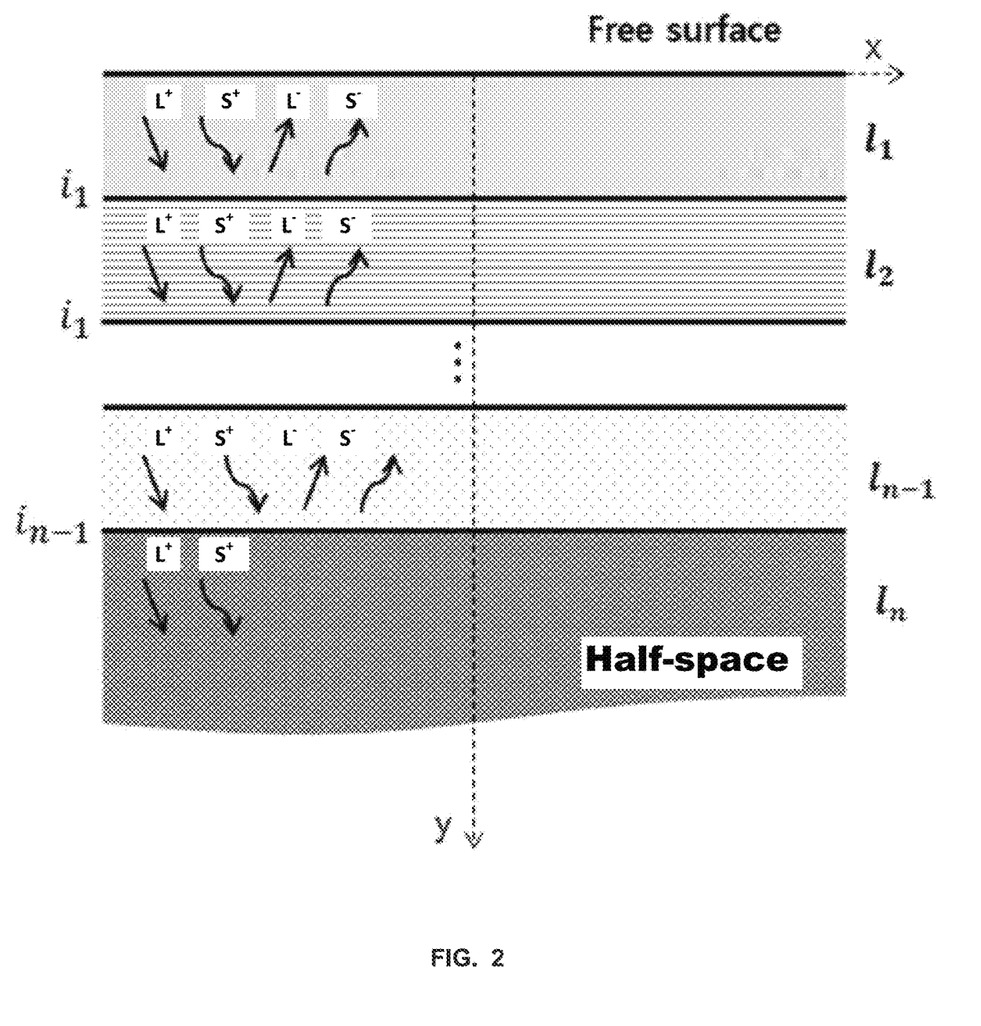
FIG. 2 is a conceptual diagram illustrating surface waves in a multilayer thin film structure.

FIG. 2 is a conceptual diagram illustrating surface waves in a multilayer thin film structure.

In the multilayer structure as shown in FIG. 2, superposition of plane waves is defined by superposition of four bulk waves and an interface boundary condition. Therefore, eight waves are assumed at the interface of each layer. The eight waves acting on a top layer and a bottom layer mean a downward longitudinal wave and a downward shear wave ($L^+$, $S^+$) and an upward longitudinal wave and an upward shear wave ($L^-$, $S^-$).

According to Snell's law, elements of the bulk wave should have the same elements for an interaction therebetween. The frequency f, the angular frequency $\omega$, and the wave number k are in a direction parallel to a medium, and all equations for the displacement and the stress are expressed as Equation 8 below.

$$F = e^{i(k_x x - wt)}$$

Equation 8

A component of a wave number in a y-direction may be expressed as Equation 9 below.

$$k_{y(L\pm)} = \pm(\omega^2/\alpha^2 - k_x^2)^{1/2}$$

$$k_{y(S\pm)} = \pm(\omega^2/\beta^2 - k_x^2)^{1/2}$$

Equation 9

Since the coordinate system is assumed as two dimensions, the wave number in a z-direction does not exist. Displacement and stress at any position of the stacked structure are expressed as amplitudes of four bulk waves using an equation.

Equation 10 below is a displacement and stress equation for a bulk longitudinal wave.

$$u_x = k_x A_{(\pm)} F e^{\pm i(\omega^2/\alpha^2 - k_x^2)^{1/2} y}$$

$$u_y = \pm(\omega^2/\alpha^2 - k_x^2)^{1/2} A_{(\pm)} F e^{\pm i(\omega^2/\alpha^2 - k_x^2)^{1/2} y}$$

$$\sigma_{xx} = (\omega^2 - 2\beta^2 \omega^2/\alpha^2 2\beta^2 k_x^2) i\rho A_{(\pm)} F e^{\pm i(\omega^2/\alpha^2 - k_x^2)^{1/2} y}$$

$$\sigma_{yy} = (w^2 - 2\beta^2 k_x^2) i\rho A_{(\pm)} F e^{\pm i(\omega^2/\alpha^2 - k_x^2)^{1/2} y}$$

$$\sigma_{zz} = (1 - 2\beta^2/\alpha^2) i\omega^2 \rho A_{(\pm)} F e^{\pm i(\omega^2/\alpha^2 - k_x^2)^{1/2} y}$$

$$\sigma_{xy} = \pm 2\beta^2 k_x (\omega^2/\alpha^2 - k_x^2)^{1/2} i\rho A_{(\pm)} F e^{\pm i(\omega^2/\alpha^2 - k_y)^{1/2} y}$$

$$\sigma_{xz} = 0$$

$$\sigma_{yz} = 0$$

Equation 10

Equation 11 below represents a bulk shear wave.

$$u_x = \pm(w^2/\beta^2 - k_x^2)^{1/2} B_{(\pm)} F e^{\pm i(w^2/\alpha^2 - k_x^2)^{1/2} y}$$

$$u_y = -k_x B_{(\pm)} F e^{\pm i(w^2/\alpha^2 - k_x^2)^{1/2} y}$$

$$\sigma_{xx} = \pm 2\beta^2 k_x (w^2/\beta^2 - k_x^2)^{1/2} i\rho B_{(\pm)} F e^{\pm i(w^2/\alpha^2 - k_x^2)^{1/2} y}$$

$$\sigma_{yy} = -\sigma_{xx}$$

$$\sigma_{zz} = 0$$

$$\sigma_{xy} = (w^2 - 2\beta^2 k_x^2) i\rho B_{(\pm)} F e^{\pm i(w^2/\alpha^2 - k_x^2)^{1/2} y}$$

$$\sigma_{xz} = 0$$

$$\sigma_{yz} = 0$$

Equation 11

Thus, the displacement and the stress at any position of the multilayer structure are expressed through components of Equations 10 and 11 for the four bulk waves in the layer.

Equation 12 is an abbreviation which is arbitrarily designated for convenience.

$$C_\alpha = (\omega^2/\alpha^2 - k_x^2)^{1/2}$$

$$C_\beta = (\omega^2/\beta^2 - k_x^2)^{1/2}$$

$$g_\alpha = e^{i(\omega^2/\alpha^2 - k_x^2)^{1/2} y}$$

$$g_\beta = e^{i(\omega^2/\alpha^2 - k_x^2)^{1/2} y}$$

$$B = \omega^2 - 2\beta^2 k_x^2$$

Equation 12

The displacement and the stress of the layer, in which a common component F is omitted in the above equation, are expressed in the form of a matrix as in Equation 13 below.

Example 13

$$\begin{Bmatrix} u \\ v \\ \sigma_{yy} \\ \sigma_{xy} \end{Bmatrix} = \begin{bmatrix} k_x g_\alpha & \frac{k_x}{g_\alpha} & C_\beta g_\beta & -\frac{C_\beta}{g_\beta} \\ C_\alpha g_\alpha & -\frac{C_\alpha}{g_\alpha} & -k_x g_\beta & -\frac{k_x}{g_\beta} \\ i\rho B g_\alpha & \frac{i\rho B}{g_\alpha} & -2i\rho k_x \beta^2 C_\beta g_\beta & \frac{2i\rho k_x \beta^2 C_\beta}{g_\beta} \\ 2i\rho k_x \beta^2 C_\alpha g_\alpha & \frac{-2i\rho k_x \beta^2 C_\alpha}{g_\alpha} & i\rho B g_\beta & \frac{i\rho B}{g_\beta} \end{bmatrix} \cdot \begin{Bmatrix} A^+ \\ A^- \\ B^+ \\ B^- \end{Bmatrix}$$

In the matrix formula, a left term indicates a displacement-stress vector, and a right term indicates the product of a coefficient matrix and an amplitude vector with respect to the longitudinal wave and the shear wave. Therefore, Equation 13 represents a relationship between an amplitude, displacement, and stress of a wave at any position of the multilayer structure. Here, the coefficient matrix is referred to as [D].

In a preceding study, a transfer matrix method, which was first developed by Thomson, was used to analyze a propagation characteristic of a wave in a multilayer structure. The transfer matrix method is a technique of simplifying equations for a multilayer structure to four equations and calculating the four equations. In the multilayer structure, boundary conditions between layers and interfaces may be simplified to a condition between a first layer and a last layer.

An amplitude vector of the wave at an uppermost end of the layer is represented by the inverse of the coefficient matrix [D].

$$\begin{Bmatrix} A^+ \\ A^- \\ B^+ \\ B^- \end{Bmatrix}_{l1} = [D]^{-1}_{l1,t} \begin{Bmatrix} u_x \\ u_y \\ \sigma_{yy} \\ \sigma_{xy} \end{Bmatrix}_{l1,t} \quad \text{Equation 14}$$

$l1,t$ means a top end of the first layer. $[D]^{-1}_{l1,t}$ is expressed as Equation 15 below.

$$[D]^{-1}_t = \frac{1}{\omega^2}\begin{bmatrix} k_x\beta^2 & \frac{B}{2C_\alpha} & -\frac{i}{2\rho} & -\frac{ik_x}{2\rho C_\alpha} \\ \frac{k_x\beta^2}{g_\alpha} & -\frac{B}{C_\alpha g_\alpha} & -\frac{i}{2\rho g_\alpha} & \frac{ik_x}{2\rho C_\alpha g_\alpha} \\ \frac{B}{2C_\alpha} & -k\beta^2 & \frac{ik_x}{2\rho C_\beta} & -\frac{i}{2\rho} \\ -\frac{B}{2C_\beta g_\beta} & -\frac{k_x\beta^2}{g_\beta} & -\frac{ik_x}{2\rho C_\beta g_\beta} & -\frac{i}{2\rho g_\beta} \end{bmatrix} \quad \text{Equation 15}$$

In the first layer, displacement and stress at a bottom end are derived from an amplitude of the first layer.

$$\begin{Bmatrix} u_x \\ u_y \\ \sigma_{yy} \\ \sigma_{xy} \end{Bmatrix}_{l1,b} = [D]_{l1,b} \cdot [D]^{-1}_{l1,t} \begin{Bmatrix} u_x \\ u_y \\ \sigma_{yy} \\ \sigma_{xy} \end{Bmatrix}_{l1,t} \quad \text{Equation 16}$$

Here, $l1,b$ means the bottom end of the first layer, and a bottom coefficient matrix [D] is expressed as Equation 17 below.

$$[D_b] = \begin{bmatrix} k_x g_\alpha & k_x & C_\beta g_\beta & -C_\beta \\ C_\alpha g_\alpha & -C_\alpha & -k_x g_\beta & -k_x \\ i\rho B g_\alpha & i\rho B & -2i\rho k_x \beta^2 C_\beta g_\beta & 2i\rho k_x \beta^2 C_\beta \\ 2i\rho k_x \beta^2 C_\alpha g_\alpha & -2i\rho k_x \beta^2 C_\alpha & i\rho B g_\beta & i\rho B \end{bmatrix} \quad \text{Equation 17}$$

The matrix product of $[D]_b$ and $[D]^{-1}_t$ is defined as a matrix [T] and is expressed as Equation 18 below.

$$[T]_{l1} = [D]_{l1,b}[D]^{-1}_{l1,t} \quad \text{Equation 18}$$

Components of the coefficient matrix [T] may be expressed as Equation 19 below.

$$T_{11} = \frac{\beta^2 k_x^2}{w^2}\left(g_\alpha + \frac{1}{g_\alpha}\right) + \frac{B}{2w^2}\left(g_\beta + \frac{1}{g_\beta}\right) \quad \text{Equation 19}$$

$$T_{12} = \frac{k_x B}{2w^2 C_\alpha}\left(g_\alpha - \frac{1}{g_\alpha}\right) + \frac{k_x \beta^2 C_\beta}{w^2}\left(-g_\beta + \frac{1}{g_\beta}\right)$$

$$T_{13} = \frac{k_x}{2iw^2\rho}\left(g_\alpha + \frac{1}{g_\alpha} - g_\beta - \frac{1}{g_\beta}\right)$$

-continued $$T_{14} = \frac{k_x^2}{2iw^2\rho C_\alpha}\left(g_\alpha - \frac{1}{g_\alpha}\right) + \frac{C_\beta}{2iw^2\rho}\left(g_\beta - \frac{1}{g_\beta}\right)$$

$$T_{21} = \frac{C_\alpha \beta^2 k_x}{w^2}\left(g_\alpha - \frac{1}{g_\alpha}\right) + \frac{B k_x}{2w^2 C_\beta}\left(-g_\beta + \frac{1}{g_\beta}\right)$$

$$T_{22} = \frac{B}{2w^2}\left(g_\alpha + \frac{1}{g_\alpha}\right) + \frac{\beta^2 k_x^2}{w^2}\left(g_\beta + \frac{1}{g_\beta}\right)$$

$$T_{33} = T_{22}$$

$$T_{34} = T_{12}$$

$$T_{41} = \frac{2i\rho\beta^4 k_x^2 C_\alpha}{w^2}\left(g_\alpha - \frac{1}{g_\alpha}\right) + \frac{i\rho B^2}{2w^2 C_\beta}\left(g_\beta - \frac{1}{g_\beta}\right)$$

$$T_{42} = T_{31}$$

$$T_{32} = \frac{i\rho B^2}{2w^2 C_\alpha}\left(g_\alpha - \frac{1}{g_\alpha}\right) + \frac{2i\rho\beta^4 k_x^2 C_\beta}{w^2}\left(g_\beta - \frac{1}{g_\beta}\right)$$

$$T_{33} = T_{22}$$

$$T_{34} = T_{12}$$

$$T_{41} = \frac{2i\rho\beta^4 k_x^2 C_\alpha}{w^2}\left(g_\alpha - \frac{1}{g_\alpha}\right) + \frac{i\rho B^2}{2w^2 C_\beta}\left(g_\beta - \frac{1}{g_\beta}\right)$$

$$T_{42} = T_{31}$$

$$T_{43} = T_{21}$$

$$T_{44} = T_{11}$$

Displacement and stress at the interface should satisfy a continuity condition. Therefore, the displacement and the stress may be expressed as Equation 20 below.

$$\begin{Bmatrix} u_x \\ u_y \\ \sigma_{yy} \\ \sigma_{xy} \end{Bmatrix}_{l2,t} = \begin{Bmatrix} u_x \\ u_y \\ \sigma_{yy} \\ \sigma_{xy} \end{Bmatrix}_{l1,b} = [T]_{l1}\begin{Bmatrix} u_x \\ u_y \\ \sigma_{yy} \\ \sigma_{xy} \end{Bmatrix}_{l1,t} \quad \text{Equation 20}$$

A relationship between the displacement, the stress, and the amplitude in the multilayer structure comprised of n layers is expressed as Equation 21 below.

$$\begin{Bmatrix} A^+ \\ A^- \\ B^+ \\ B^- \end{Bmatrix}_{ln} = [S]\begin{Bmatrix} u_x \\ u_y \\ \sigma_{yy} \\ \sigma_{xy} \end{Bmatrix}_{l1,t} \quad \text{Equation 21}$$

Here, n means the last layer is a half-space, and [S] represents the product of the matrices for all the layers.

$$[S] = [D]^{-1}_{ln,t}[T]_{l(n-1)}[T]_{l(n-2)}\ldots[T]_{l1} \quad \text{Equation 22}$$

In order to solve Equation 22, boundary conditions should be applied to an entirety of the system comprised of multiple layers. In the top end of the first layer, since $\sigma_{yy}$ and $\sigma_{xy}$ that are stress components are in a free surface under a boundary condition, $\sigma_{yy}$ and $\sigma_{xy}$ are given as zero. Since there are no components of the longitudinal wave and the shear wave reflected in the half-space, amplitude vectors A' and B' are given as zero. Therefore, an equation for a semi-infinite solid located in a free space is expressed as Equation 23 below.

$$\begin{Bmatrix} A^+ \\ 0 \\ B^+ \\ 0 \end{Bmatrix}_{In} = [S] \begin{Bmatrix} u_x \\ u_y \\ 0 \\ 0 \end{Bmatrix}_{I1,t} \qquad \text{Equation 23}$$

A term in which a component is zero is omitted from a left term of Equation 23 and summarized to be expressed as Equation 24.

$$\begin{Bmatrix} 0 \\ 0 \end{Bmatrix} = \begin{bmatrix} S_{21} & S_{22} \\ S_{41} & S_{42} \end{bmatrix} \begin{Bmatrix} u_x \\ u_y \end{Bmatrix}_{I1,t} \qquad \text{Equation 24}$$

In order to establish Equation 24, a value of a determinant of the [S] matrix should be obtained as zero. Therefore, Equation 25 below is satisfied.

$$\begin{bmatrix} S_{21} & S_{22} \\ S_{41} & S_{42} \end{bmatrix} = 0 \qquad \text{Equation 25}$$

Finally, a root of a characteristic equation (f) is expressed as a function of a frequency and a velocity and represented by a dispersion curve. A dispersion curve of the surface wave is derived by applying the transfer matrix method.

Referring to FIG. 1 again, a propagation speed of the surface wave measured from the substrate, on which the first thin film is formed, is substituted into the dispersion curve so that a stiffness constant matching the propagation speed of the surface wave is obtained and strengths of the substrate and the thin film are measured (S160). An ultrasonic wave device, which is widely used, may be employed to measure the surface wave.

Further, Equation 26 below may be used in a process of obtaining the stiffness constant which is actually measured from the propagation speed of the surface wave.

$$C_L = \sqrt{\frac{K_N d_i}{\rho_i}} \qquad \text{Equation 26}$$

$$C_S = \sqrt{\frac{K_T d_i}{\rho_i}}$$

In Equation 26, $C_L$ and $C_S$ are sound wave velocities of the longitudinal wave and the shear wave, $K_N$ and $K_T$ are a normal stiffness constant and a tangential stiffness constant, $d_i$ is the thickness of the second thin film, and $\rho_i$ is the density of the second thin film.

Hereinafter, a result of comparing the method of measuring adhesive strength of a thin film according to the present invention, which is a non-destructive test, with a conventional method of measuring adhesive strength of a thin film using a scratch test, which is a destructive test, is described.

First, direct current (DC) magnetron sputtering was used to prepare five samples in which thin films having different adhesive strengths were formed.

Process conditions are shown in Table 1 below.

TABLE 1

| Chamber pressure | Target distance | Flow rate | DC power (W) | Working pressure |
|---|---|---|---|---|
| ≤5 × 10⁻⁶ Torr | 7 cm | 15 sccm | 28.8,57.6,86.4,115.2,144 | 3.7 mTorr |

Five samples results of the thin films prepared under the above process conditions are shown in Table 2 below.

TABLE 2

| DC power (W) | Thickness (nm) | Error (%) |
|---|---|---|
| 28.8 | 650 | 8.333 |
| 57.6 | 637.33 | 6.222 |
| 86.4 | 640.33 | 6.722 |
| 115.2 | 597 | −0.5 |
| 144 | 603 | 0.5 |

Figure 3:
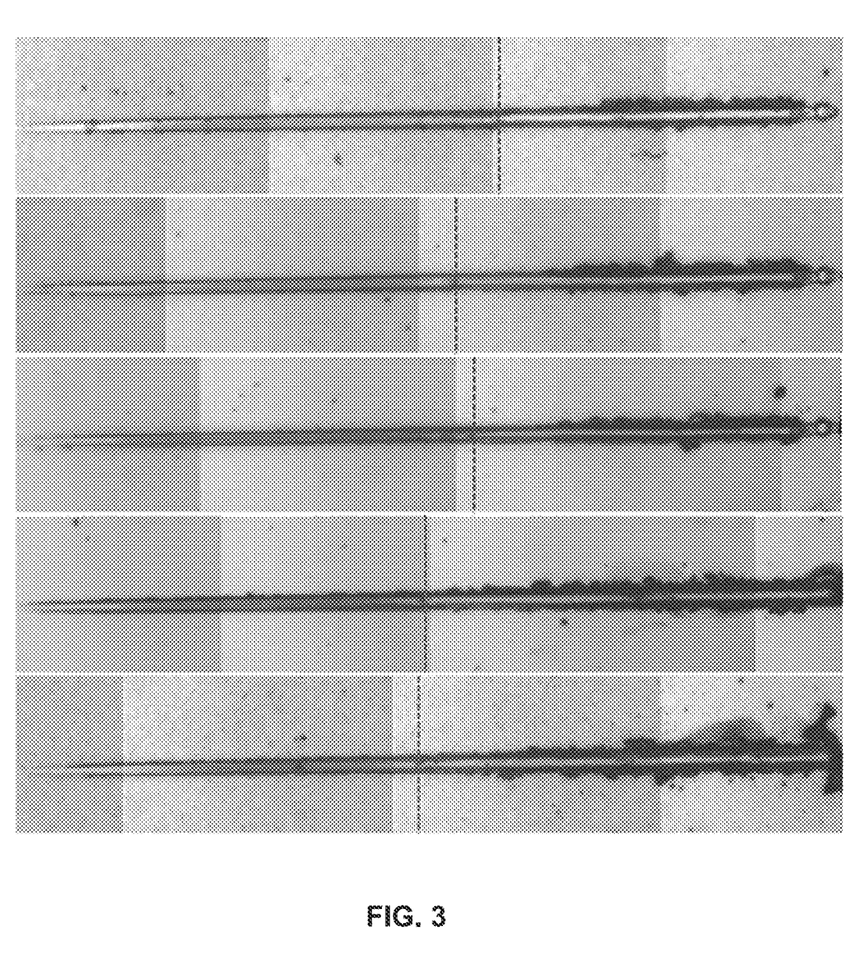
FIG. 3 shows photographs in which a conventional scratch test is applied to thin films formed on five samples prepared for testing a result of the present invention.
Figure 4:
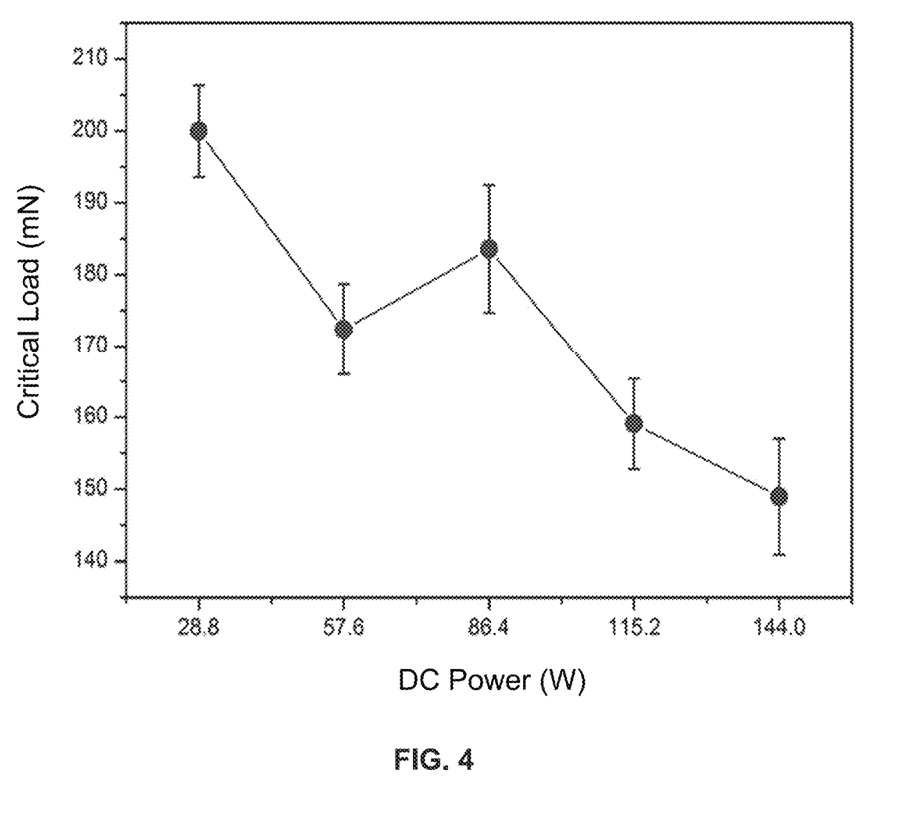
FIG. 4 is a graph showing an average value of adhesion (mN) measured by performing the scratch test on the five samples.

Results of measuring adhesion (mN) measured by performing a scratch test on the five samples prepared under the above process conditions as shown in FIG. 3 are shown in Table 3 below, and average values of Table 3 are shown as a graph in FIG. 4.

TABLE 3

| DC power (W) | 28.8 | 59.6 | 86.4 | 115.2 | 144 |
|---|---|---|---|---|---|
| 1 | 195.34 | 160.10 | 196.48 | 158.89 | 138.60 |
| 2 | 196.61 | 165.69 | 175.40 | 156.35 | 150.34 |
| 3 | 198.75 | 167.40 | 184.86 | 159.75 | 154.20 |
| 4 | 197.90 | 163.07 | 186.18 | 153.78 | 158.47 |
| 5 | 211.14 | 176.77 | 174.96 | 156.76 | 143.33 |
| average | 199.95 | 166.61 | 183.57 | 157.11 | 148.99 |

Meanwhile, in operation S110 of FIG. 1, in order to apply the present invention, the thicknesses, the densities, the longitudinal wave velocities, and the shear wave velocities of the first thin film and the substrate were input as the first input values as shown in Table 4 below.

TABLE 4

| Material | Thickness [nm] | Density [kg/m³] | Longitudinal velocity [m/s] | Shear velocity [m/s] |
|---|---|---|---|---|
| Titanium | 600 | 4480 | 6070 | 3310 |
| Silicon | Half-space | 2340 | 8430 | 5840 |

Figure 5:
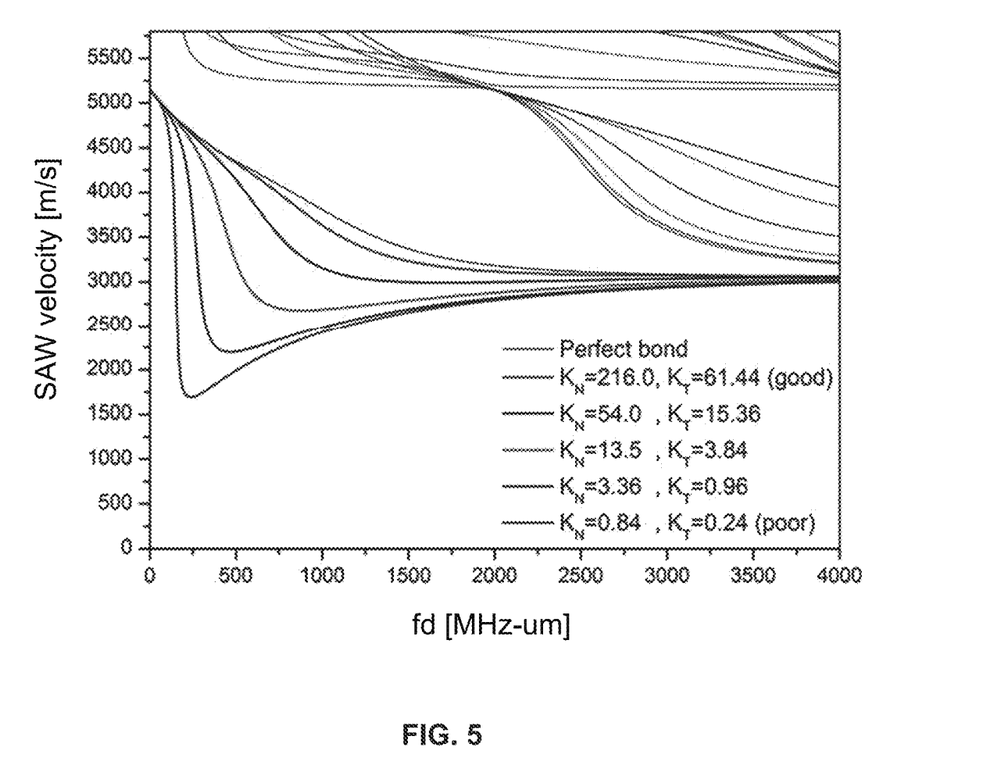
FIG. 5 is a dispersion curve graph showing the dispersion characteristics obtained as a result of operation S150 of FIG. 1.

Dispersion characteristics calculated as a result of the input of the first input values were shown as the dispersion curve graph as shown in FIG. 5. Further, in order to measure the propagation speed of the surface wave in operation S160 of FIG. 1, the speed of the sound wave was measured for each sample in a test condition shown in Table 5 below.

TABLE 5

| Apparatus | UH2 (Olympus Corp.) |
|---|---|
| Acoustic lens | Models: AL2M631 and AL4M631 |
| Frequency | 200 MHz |
| Working distance | 310 μm |
| Apparatus angle | 120° (2nd critical angle) |
| Couplant | De-ionized water |
| De-ionized water temp. | 21.5° C. |

Measured velocities (m/s) of the sound waves are shown in Table 6 below.

TABLE 6

| DC power (W) | 28.8 | 59.6 | 86.4 | 115.2 | 144 |
|---|---|---|---|---|---|
| 1 | 4862 | 4750 | 4819 | 4709 | 4723 |
| 2 | 4862 | 4777 | 4791 | 4863 | 4683 |
| 3 | 4791 | 4763 | 4819 | 4736 | 4709 |
| 4 | 4763 | 4791 | 4805 | 4805 | 4683 |
| 5 | 4877 | 4805 | 4791 | 4723 | 4709 |
| average | 4831 | 4777.2 | 4708 | 4731.2 | 4701.4 |

Figure 6:
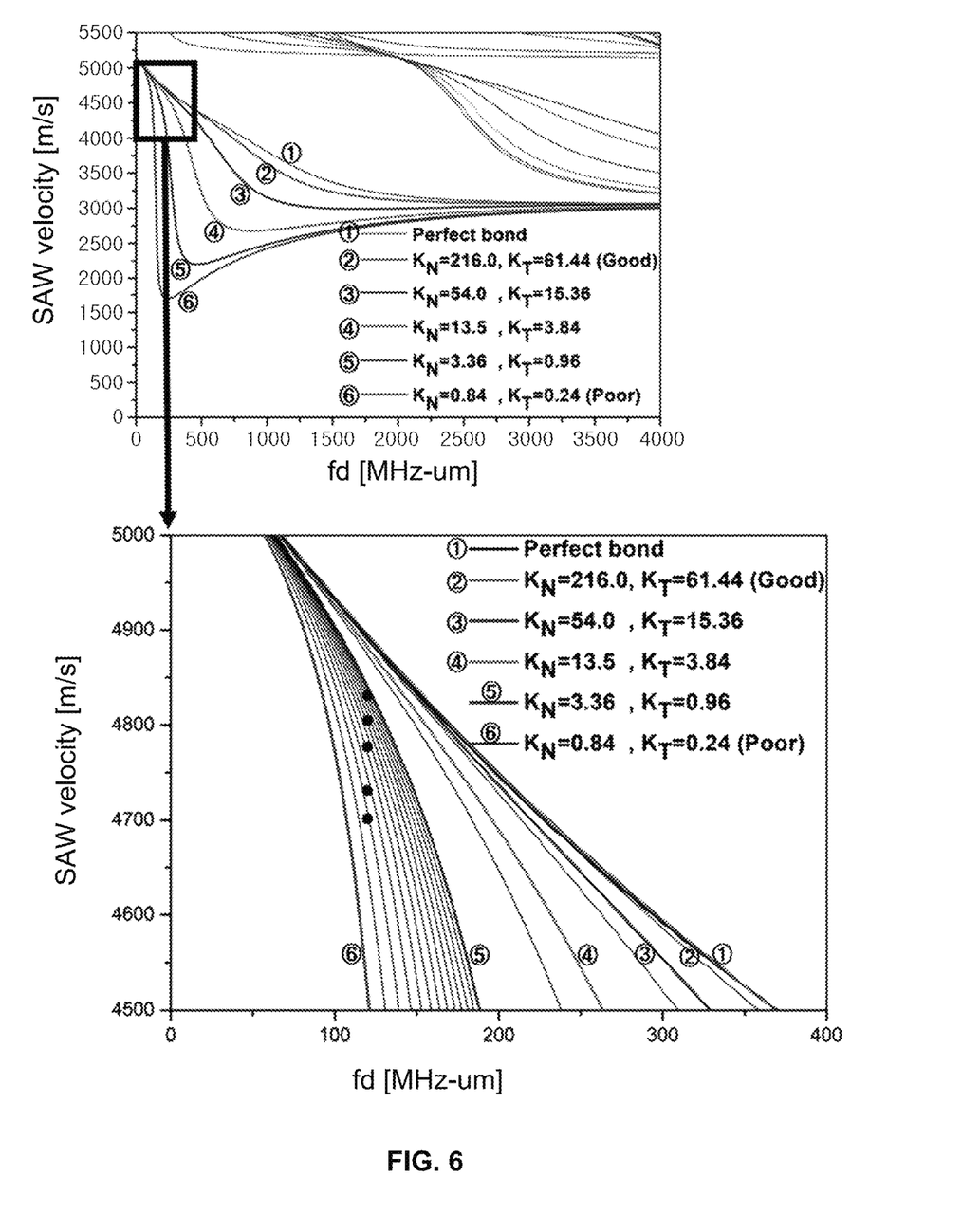
FIG. 6 is a diagram illustrating a process of comparing velocity of a measured surface wave with the dispersion curve graph of FIG. 5 in operation S160 of FIG. 1.
Figure 7:
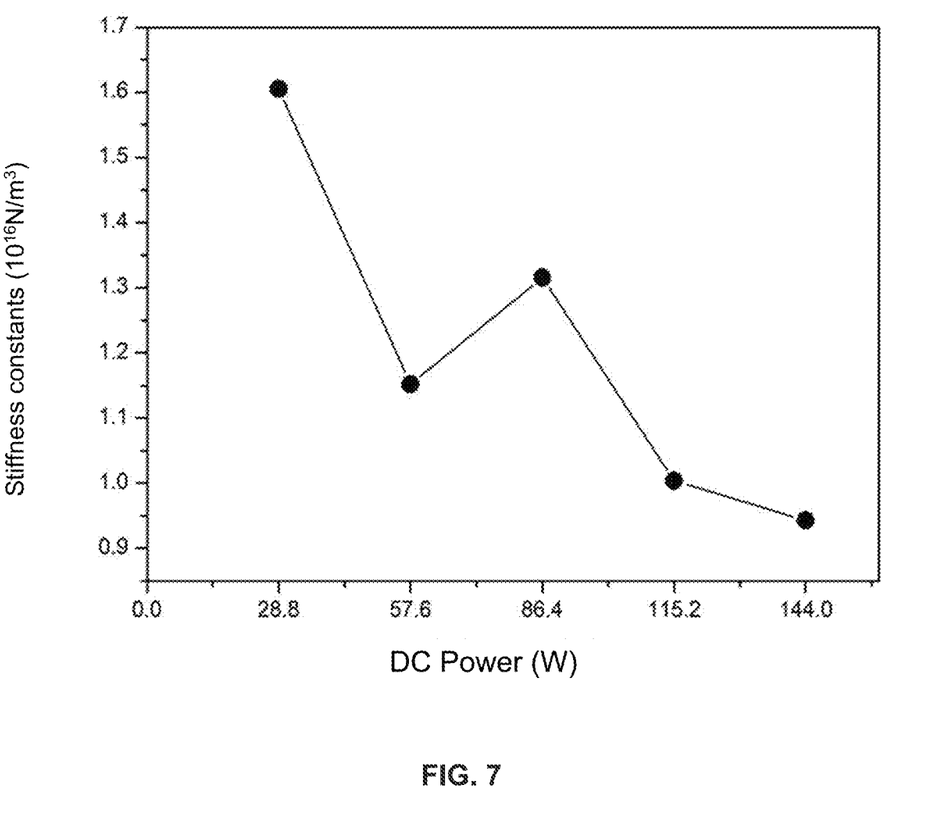
FIG. 7 is a graph showing a stiffness constant obtained as a result of the comparison of FIG. 6.
Figure 8:
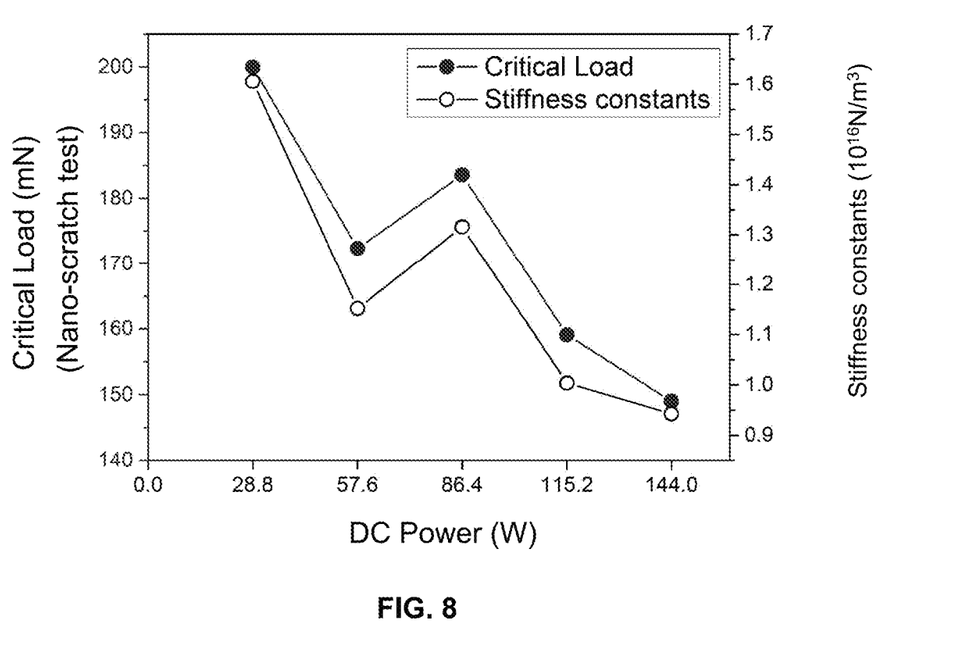
FIG. 8 is a graph obtained by overlapping FIG. 4 showing the adhesion calculated according to the conventional method with FIG. 7 showing the stiffness constant calculated according to the present invention.

A process of comparing the measured velocities of the surface waves with the dispersion curve graph of FIG. 5 was illustrated in FIG. 6. The resulting stiffness constants are shown in FIG. 7. When FIG. 4 showing the adhesion calculated according to the conventional method is overlapped with FIG. 7 showing the stiffness constants calculated according to the present invention, the same tendency exhibits as shown in FIG. 8. Therefore, the adhesion may be calculated by multiplying the stiffness constants of the present invention by a proportional constant.

According to one embodiment of the present invention, the dispersion characteristics may be tabulated, and then the dispersion characteristics tabulated by measuring the surface waves of the thin films manufactured through the same process may be used so that an iterative calculation may not be required.

Figure 9:
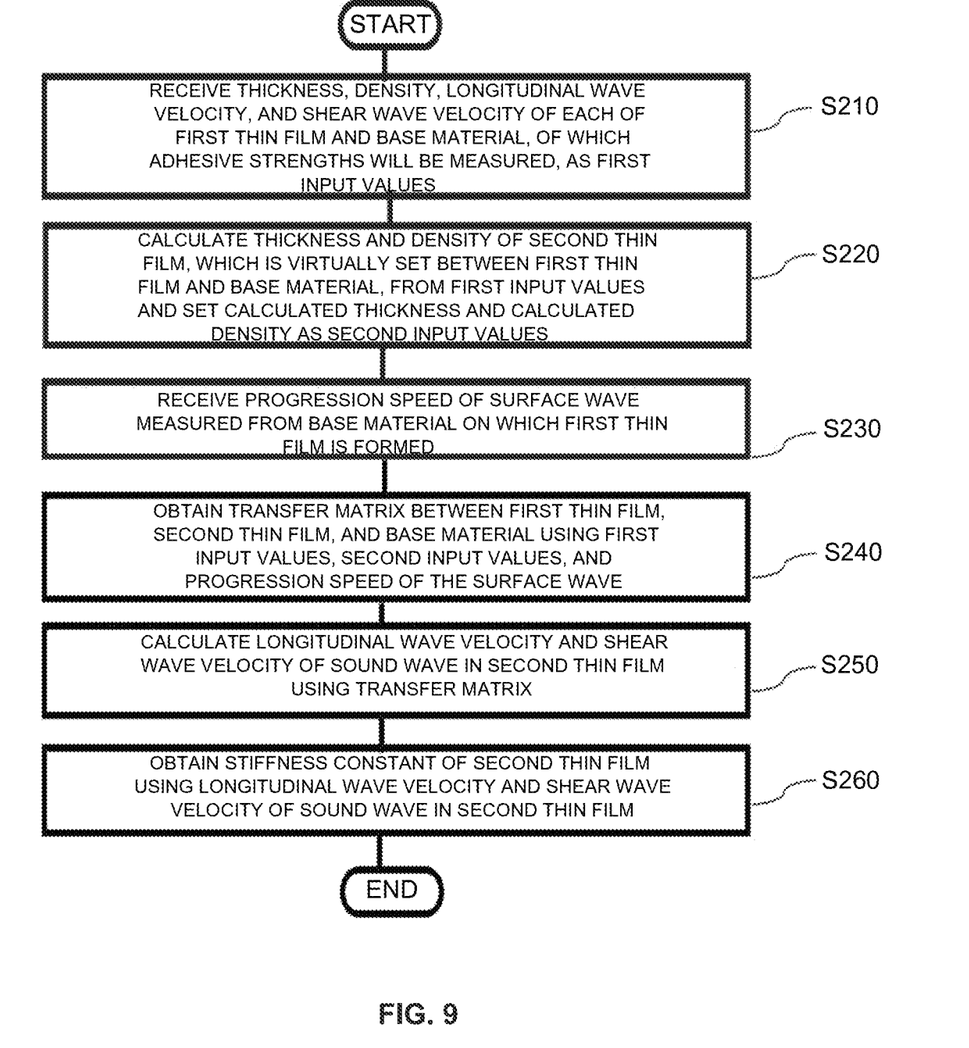
FIG. 9 is a flowchart illustrating a method of measuring adhesive strength of a thin film using a dispersion characteristic of a surface wave according to another exemplary embodiment of the present invention.

FIG. 9 is a flowchart illustrating a method of measuring adhesive strength of a thin film using a dispersion characteristic of a surface wave according to another exemplary embodiment of the present invention.

Referring to FIG. 9, the method of measuring adhesive strength of a thin film using a dispersion characteristic of a surface wave according to another exemplary embodiment of the present invention includes receiving a thickness, a density, a longitudinal wave velocity, and a shear wave velocity of each of the first thin film and the substrate, of which adhesive strengths will be measured, as first input values (S210), and calculating a thickness and a density of a second thin film, which is virtually set between the first thin film and the substrate, from the first input values and setting the calculated thickness and the calculated density as second input values (S220). The above process is the same as that of the preceding embodiment, and thus a duplicate description thereof will be omitted herein.

Thereafter, a propagation speed of the surface wave measured from the substrate on which the first thin film is formed is received (S230).

A transfer matrix between the first thin film, the second thin film, and the substrate is obtained using the first input values, the second input values, and the propagation speed of the surface wave (S240).

A longitudinal wave velocity and a shear wave velocity of the sound wave in the second thin film is calculated using the transfer matrix (S250). A stiffness constant of the second thin film is obtained using the longitudinal wave velocity and the shear wave velocity of the sound wave in the second thin film, and adhesive strengths of the thin film and the substrate are extracted through the stiffness constant of the second thin film (S260).

In the preceding embodiment, after the dispersion curve graph was prepared in consideration of the dispersion characteristic, the actually measured value and the dispersion curve graph were compared to extract an adhesive strength from a dispersion curve graph. In the present embodiment, instead of preparing a dispersion curve graph by discretely varying the stiffness constant, conversely, since a condition in which a characteristic equation of the transfer matrix is zero is used by measuring a velocity of the surface wave and substituting the measured velocity of the surface wave, calculation is required at every measurement, but, unlike a discrete value in the preceding embodiment, the adhesive strength may be calculated more accurately.

The calculating of the longitudinal wave velocity and the shear wave velocity of the sound wave in the second thin film using the transfer matrix may be performed through a condition in which the characteristic equation of the transfer matrix is zero.

Further, the obtaining of the stiffness constant in the second thin film using the longitudinal wave velocity and the shear wave velocity of the sound wave in the second thin film, and the measurement of the adhesive strengths of the substrate and the first thin film through the stiffness constant of the second thin film may be performed through Equation 26.

As described above, in accordance with the method of measuring adhesive strength of a thin film according to the present invention and a computer-readable recording medium having a program which is recorded thereon and performs the same, the adhesive strength of the thin film may be non-destructively measured using the surface wave.

Further, the computer-readable recording medium according to the present invention records the above program for the method of measuring adhesive strength of a thin film.

Although the description has been made with reference to the exemplary embodiments of the present invention, it should be understood that various alternations and modifications of the present invention can be devised by those skilled in the art to which the present invention pertains without departing from the spirit and scope of the present invention, which are defined by the appended claims.

What is claimed is:

1. A method of measuring adhesive strengths of a substrate and a thin film using a sound wave measured from a thin film structure on which the thin film is formed on the substrate through an electronic calculator, the method comprising:

receiving, by the electronic calculator, a thickness, a density, a longitudinal wave velocity, and a shear wave velocity of each of a first thin film and the substrate, of which adhesive strengths will be measured, as first input values;

calculating, by the electronic calculator, a thickness and a density of a second thin film, which is virtually set between the first thin film and the substrate, from the first input values and setting the calculated thickness and the calculated density as second input values;

calculating, by the electronic calculator, a longitudinal wave velocity and a shear wave velocity of the second thin film according to a stiffness constant by varying the stiffness constant of the second thin film and setting the calculated longitudinal wave velocity and the calculated shear wave velocity as third input values;

obtaining, by the electronic calculator, a transfer matrix between the first thin film, the second thin film, and the substrate using the first to third input values;

calculating, by the electronic calculator, a dispersion characteristic of a velocity of a surface wave using the transfer matrix; and substituting, by the electronic calculator, a propagation speed of the surface wave measured from the substrate, on which the first thin film is formed, into a dispersion curve and obtaining a stiffness constant matching the propagation speed of the surface wave to measure adhesive strengths of the substrate and the thin film, wherein the calculating of the longitudinal wave velocity and the shear wave velocity of the second thin film according to the stiffness constant by varying the stiffness constant of the second thin film and setting the calculated longitudinal wave velocity and the calculated shear wave velocity as the third input values is performed through a relational expression of:

$$C_L = \sqrt{\frac{K_N d_i}{\rho_i}}$$

$$C_S = \sqrt{\frac{K_T d_i}{\rho_i}}$$

where $C_L$ and $C_S$ respectively denote a sound wave velocity of the longitudinal wave and a sound wave velocity of the shear wave, $K_N$ and $K_T$ denote a normal stiffness constant and a tangential stiffness constant, $d_i$ denotes a thickness of the second thin film, and $\rho_i$ denotes a density of the second thin film.

2. The method of claim 1, wherein, in the calculating of the thickness and the density of the second thin film, which is virtually set between the first thin film and the substrate, from the first input values and the setting of the calculated thickness and the calculated density as the second input values, a thickness of the second thin film is set in a range of 3% to 5% of the thickness of the first thin film, and the density of the second thin film is set in a range of 10% to 12% of a material having the lowest density among the first thin film and the substrate below the first thin film.

3. The method of claim 1, wherein the calculating of the dispersion characteristic of the velocity of the surface wave using the transfer matrix is performed through a condition in which a characteristic equation of the transfer matrix is zero.

4. A non-transitory computer-readable medium on which a program of the method of measuring adhesive strength of a thin film using a dispersion characteristic of a surface wave according to claim 1 is recorded.

5. A method of measuring adhesive strengths of a substrate and a thin film using a sound wave measured from a thin film structure on which the thin film is formed on the substrate through an electronic calculator, the method comprising:

receiving, by the electronic calculator, a thickness, a density, a longitudinal wave velocity, and a shear wave velocity of each of a first thin film and the substrate, of which adhesive strengths will be measured, as first input values;

calculating, by the electronic calculator, a thickness and a density of a second thin film, which is virtually set between the first thin film and the substrate, from the first input values and setting the calculated thickness and the calculated density as second input values;

receiving, by the electronic calculator, a propagation speed of a surface wave measured from the substrate on which the first thin film is formed;

obtaining, by the electronic calculator, a transfer matrix between the first thin film, the second thin film, and the substrate using the first input values, the second input values, and the propagation speed of the surface wave;

calculating, by the electronic calculator, the longitudinal wave velocity and the shear wave velocity of the sound wave in the second thin film using the transfer matrix; and obtaining, by the electronic calculator, a stiffness constant of the second thin film using the longitudinal wave velocity and the shear wave velocity of the sound wave in the second thin film and extracting the adhesive strengths of the substrate and the first thin film through the stiffness constant of the second thin film, wherein the obtaining of the stiffness constant of the second thin film using the longitudinal wave velocity and the shear wave velocity of the sound wave in the second thin film and the measuring of the adhesive strengths of the substrate and the first thin film through the stiffness constant of the second thin film are performed through a relational expression of:

$$C_L = \sqrt{\frac{K_N d_i}{\rho_i}}$$

$$C_S = \sqrt{\frac{K_T d_i}{\rho_i}}$$

where $C_L$ and $C_S$ respectively denote a sound wave velocity of the longitudinal wave and a sound wave velocity of the shear wave, $K_N$ and $K_T$ denote a normal stiffness constant and a tangential stiffness constant, $d_i$ denotes a thickness of the second thin film, and $\rho_i$ denotes a density of the second thin film.

6. The method of claim 5, wherein, in the calculating of the thickness and the density of the second thin film, which is virtually set between the first thin film and the substrate, from the first input values and setting the calculated thickness and the calculated density as the second input values, a thickness of the second thin film is set in a range of 3% to 5% of the thickness of the first thin film, and the density of the second thin film is set in a range of 10% to 12% of a material having the lowest density among the first thin film and the substrate below the first thin film.

7. The method of claim 5, wherein the calculating of the longitudinal wave velocity and the shear wave velocity of the sound wave in the second thin film using the transfer matrix is performed through a condition in which a characteristic equation of the transfer matrix is zero.

* * * * *